United States Patent
Chen et al.

(10) Patent No.: US 7,697,825 B2
(45) Date of Patent: Apr. 13, 2010

(54) DVD PLAYER WITH LANGUAGE LEARNING FUNCTION

(75) Inventors: Wen-Kuan Chen, Chu Tung Town, Hsin Chu County (TW); Yu-Chi Chen, Hsin Chu (TW); Chien-Min Chen, Hsin Chu (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 1213 days.

(21) Appl. No.: 11/179,462

(22) Filed: Jul. 13, 2005

(65) Prior Publication Data

US 2006/0039682 A1 Feb. 23, 2006

(30) Foreign Application Priority Data

Aug. 18, 2004 (TW) .............................. 93124886 A

(51) Int. Cl.
*H04N 5/00* (2006.01)
(52) U.S. Cl. .................... 386/125; 386/98; 386/126; 360/86
(58) Field of Classification Search ............ 386/98, 386/125, 126; 360/86
See application file for complete search history.

(56) References Cited

U.S. PATENT DOCUMENTS

| 2003/0190148 A1* | 10/2003 | Lee ............................ 386/70 |
| 2003/0216922 A1* | 11/2003 | Gonzales et al. ............ 704/260 |
| 2004/0215445 A1* | 10/2004 | Kojima ........................ 704/9 |
| 2005/0144010 A1* | 6/2005 | Peng .......................... 704/277 |

* cited by examiner

*Primary Examiner*—Thai Tran
*Assistant Examiner*—Girumsew Wendmagegn
(74) *Attorney, Agent, or Firm*—Muncy, Geissler, Olds & Lowe, PLLC

(57) ABSTRACT

A DVD player with language learning function using a general DVD as an audio source of language learning. The DVD player includes a DVD play unit for playing the audio and video of the DVD and outputting a subtitle picture and display information for the subtitle picture according to a play control signal, a text identifying unit for receiving the subtitle picture and converting the subtitle picture into text data, a text-to-speech unit for receiving the text data and converting the text data into synthesized voice signal, and a control module for receiving the display information of the subtitle picture and generating the play control signal according to the display information and a learning mode selected by the user. Thus, the DVD player of the invention does not need specific audio source media.

6 Claims, 7 Drawing Sheets

DVD PLAYER WITH LANGUAGE LEARNING FUNCTION

This application claims the benefit of the filing date of Taiwan Application Ser. No. 093124886, filed on Aug. 18, 2004, the content of which is incorporated herein by reference.

BACKGROUND OF THE INVENTION

1. Field of the Invention

The invention relates to a DVD player, and more particularly to a DVD player with language learning function capable of converting a DVD subtitle picture into text data and voice data.

2. Description of the Related Art

Typical language learning apparatuses need specific audio source media. That is, different audio source media have to be provided according to different language learning apparatuses. So, the learning object is limited to the audio source media for the language learning apparatus.

The video, audio and text data of a typical DVD (Digital Versatile Disk) are independent. When a DVD player is playing a DVD, an audio decoder, a video decoder and a sub-picture decoder are used to decode the audio signal, the video signal and the sub-picture units. FIG. 1 shows the hardware architecture of a typical DVD player. Referring to FIG. 1, a typical DVD player 10 includes a navigator 11, a demultiplexer 12, a decoder 13, an audio post process unit 14, an audio output unit 15, a video post process unit 16, a video output unit 17 and a user interface 18. The navigator 11 reads data from an optical disk 19 according to an input signal from the user interface 18, and then the demultiplexer 12 reads signals from the navigator 11 and outputs the audio data, video data, and sub-picture units to an audio decoder 131, a video decoder 132 and a sub-picture decoder 133 in the decoder 13.

The sub-picture decoder 133 decodes the sub-picture units to generate subtitle pictures and display information (including the information of time, positions of the subtitle pictures, color contrast of the subtitle pictures, and the like) of the subtitle pictures, and outputs the subtitle pictures according to the display time of the subtitle pictures. Generally, the subtitle pictures are recorded in the DVD in a bitmap format. The video post process unit 16 receives the subtitle pictures outputted from the sub-picture decoder 133 so as to combine the subtitle pictures with the video outputted from the video decoder 132. The audio decoder 131, the video decoder 132 and the sub-picture decoder 133 determine the output time according to the timing of the system. The typical DVD player uses the time of the video data or the audio data as the playing reference.

However, the typical DVD player can not be used as a language learning apparatus.

SUMMARY OF THE INVENTION

It is therefore an object of the invention to provide a DVD player with language learning function using the DVDs as the audio source media.

To achieve the above-mentioned object, the DVD player of the invention with the language learning function includes a DVD play unit for playing the audio and video of the DVD and outputting subtitle pictures and display information for the subtitle pictures according to a play control signal, a text identifying unit for receiving the subtitle pictures and converting the subtitle pictures into text data, a text-to-speech unit for receiving the text data and converting the text data into synthesized voice signal, and a control module for receiving the display information of the subtitle picture and generating the play control signal according to the display information and a learning mode selected by the user.

Thus, the DVD player of the invention does not need specific audio source media.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:-

DETAILED DESCRIPTION OF THE INVENTION

The DVD player of the invention with language learning function will be described with reference to the accompanying drawings.

Because the audio data, video data and subtitle pictures of the DVD are respectively processed by different decoders, which respectively output the audio signal, video signal and subtitle picture. Thus, the DVD player of the invention with language learning function further processes the subtitle picture as the object of language learning.

Figure 2:
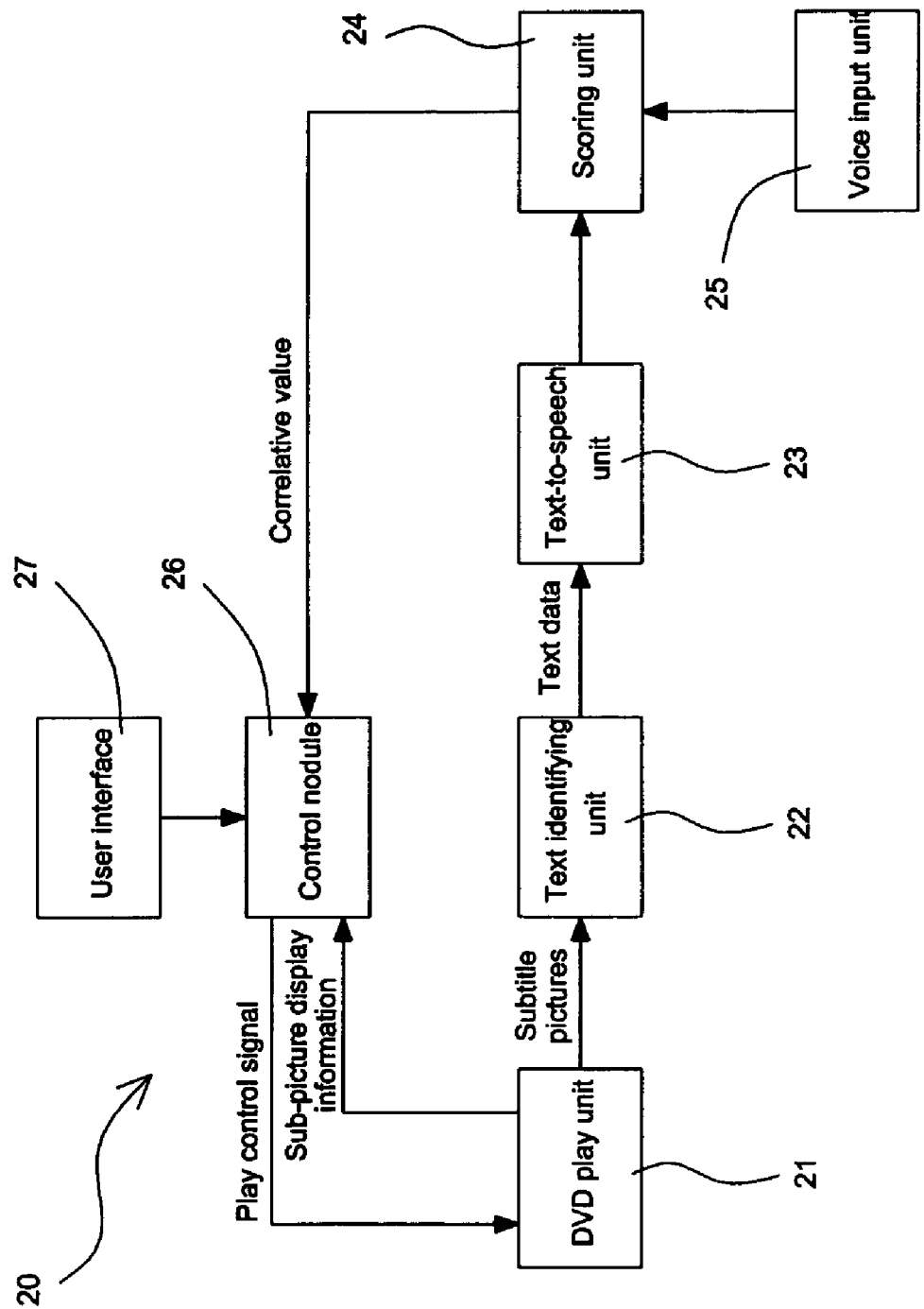
FIG. 2 shows the architecture of a DVD player with language learning function according to a first embodiment of the invention.

FIG. 2 shows the architecture of a DVD player with language learning function according to a first embodiment of the invention. Referring to FIG. 2, the DVD player 20 of the invention with language learning function includes a DVD play unit 21, a text identifying unit 22, a text-to-speech unit 23, a scoring unit 24, a voice input unit 25, a control module 26 and a user interface 27.

Figure 1:
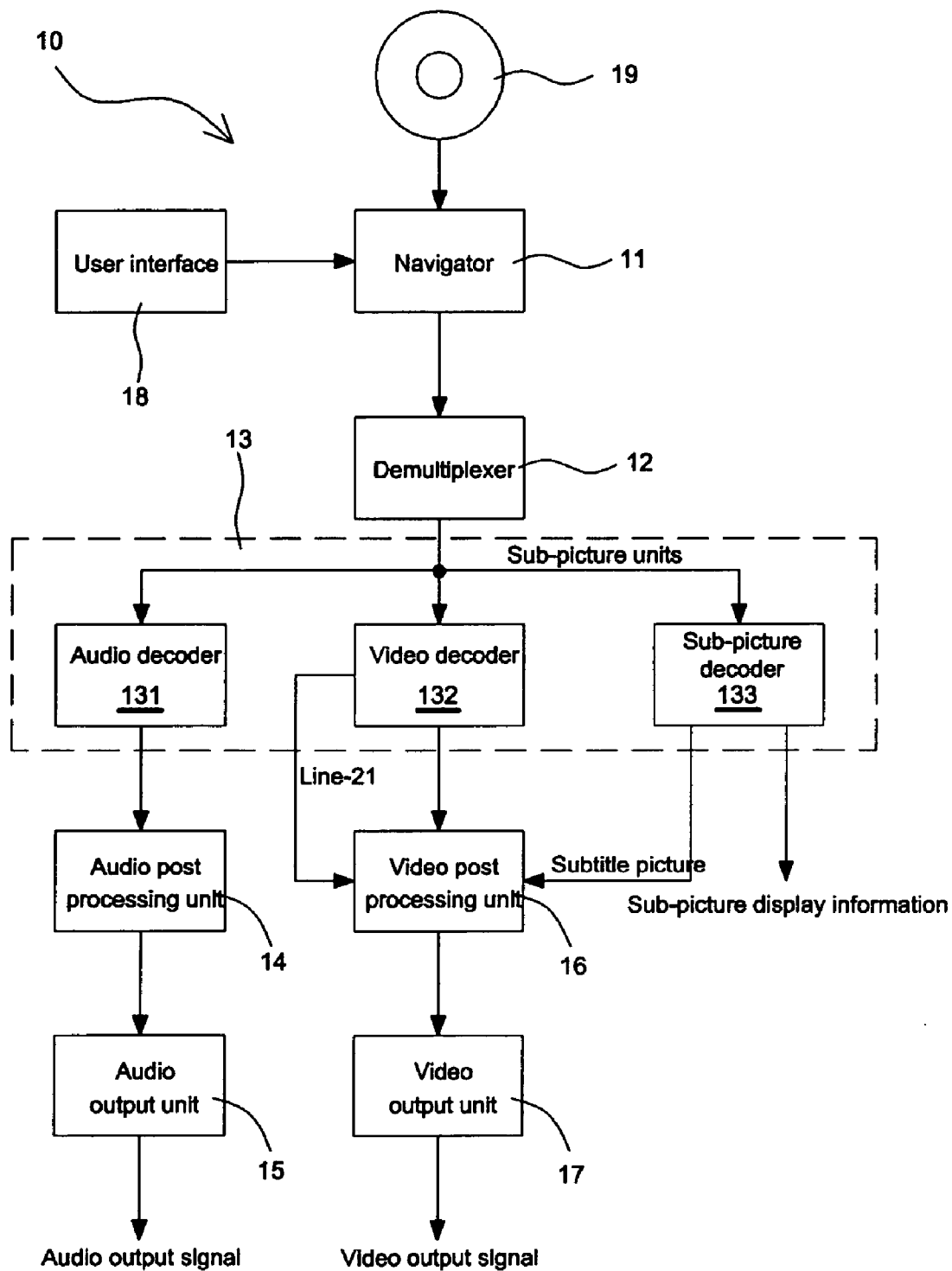
FIG. 1 shows the hardware architecture of a typical DVD player.

The DVD play unit 21 has the architecture of the typical DVD player, as shown in FIG. 1, so the DVD play unit 21 can generate the subtitle pictures and the display information of the subtitle pictures. The text identifying unit 22 receives the subtitle pictures outputted from the DVD play unit 21 and converts the subtitle pictures into text data. When received text data, the text-to-speech unit 23 generates a reference audio signal corresponding to the text data. When a user (learner) is watching a DVD video and wants to listen to or learn the pronunciation of the displayed subtitle picture repeatedly, he or she can select the learning mode through the user interface and talks to the language learning apparatus 20 through the voice input unit 25. The language learning apparatus 20 utilizes the scoring unit 24 to compare the user's pronunciation to the reference audio signal generated by the text-to-speech unit 23, and then generate a correlative value as the reference for the scoring result. The control module 26 can thus display the scoring result, such as scores, according to the correlative value.

The text identifying unit 22 performs the text identifying process according to the subtitle pictures, which have a Bitmap image format. The architecture and technology of recognizing the text in the image have been disclosed in the prior art, and detailed descriptions thereof will be omitted. In addition, one embodiment of the text-to-speech unit 23 is to build a text-audio database in advance. When receives the text data, the text-to-speech unit 23 finds the audio signal corresponding to the text data from the text-audio database and then outputs the audio signal.

Next, the voice input unit 25 can utilize an analog-to-digital converter to convert the user's voice into a digital voice signal. The scoring unit 24 can receive the reference audio signal outputted from the text-to-speech unit 23 and the digital voice signal generated by the voice input unit 25 simultaneously, compare the properties of the two input signals and then generate a comparison result. The scoring unit 24 is frequently implemented by comparing the similarity of the energy curves of the voices, and the similarity of the voice feature parameters.

Because the sub-picture decoder (FIG. 1) simultaneously outputs the subtitle pictures and the display information of the subtitle pictures, the control module 26 of the DVD player 20 of the invention can receive the display information (start time/end time) of the subtitle pictures. When the user has selected the learning mode, the control module 26 computes the time for the repeated play according to the display information of the subtitle picture, and outputs the computed time to the DVD play unit 21 as the replay time, and the object of language learning can be achieved. Thus, the user can momentarily set the audio of the subtitle picture to be repeatedly learned, and the control module 26 can output the play control information to the DVD play unit 21. The DVD play unit 21 can play the DVD for the play time specified by the information according to the play control information.

In addition, the invention further utilizes the display region and display time of the to-be-learned paragraph text, or the display time of the front and rear text in front and back of the to-be-learned paragraph text as the references for word-breaking, sentence-breaking and segmentation. For example, after the text identifying process, each word may serve as a basic word-breaking unit, the text data in the same display region may serve as a basic sentence-breaking unit, and the texts with close display time instants may be regarded as a larger sentence-breaking unit. Similarly, if the display time instants from the to-be-learned text to the front and rear texts are very long, the to-be-learned text may be regarded as a paragraph. Thus, the user can utilize the user interface 27 to set the learning mode, such as a word learning mode, a single sentence learning mode, a paragraph learning mode, or a typical play mode. For example, the user can select different modes through a remote controller.

The control module 26 computes the corresponding start time for the text to be repeatedly played as the play control signal according to the display information (e.g., play time) of the text data and the learning mode selected by the user, and outputs the play control signal to the DVD play unit 21. The DVD play unit 21 performs repeated plays or a single play according to the play control signal. When a user selects the word learning mode, the control module 26 computes the display time of the selected word according to the text of the selected word, and outputs the display time to the DVD play unit 21. When the user selects the single sentence learning mode, the control module 26 computes the display time of the single sentence according to the selected single sentence, and outputs the display time to the DVD play unit 21. When the user selects the paragraph learning mode, the control module 26 computes the display time of the paragraph according to the selected paragraph, and outputs the display time to the DVD play unit 21. Thus, all DVDs may serve as the audio source media for language learning.

Figure 3:
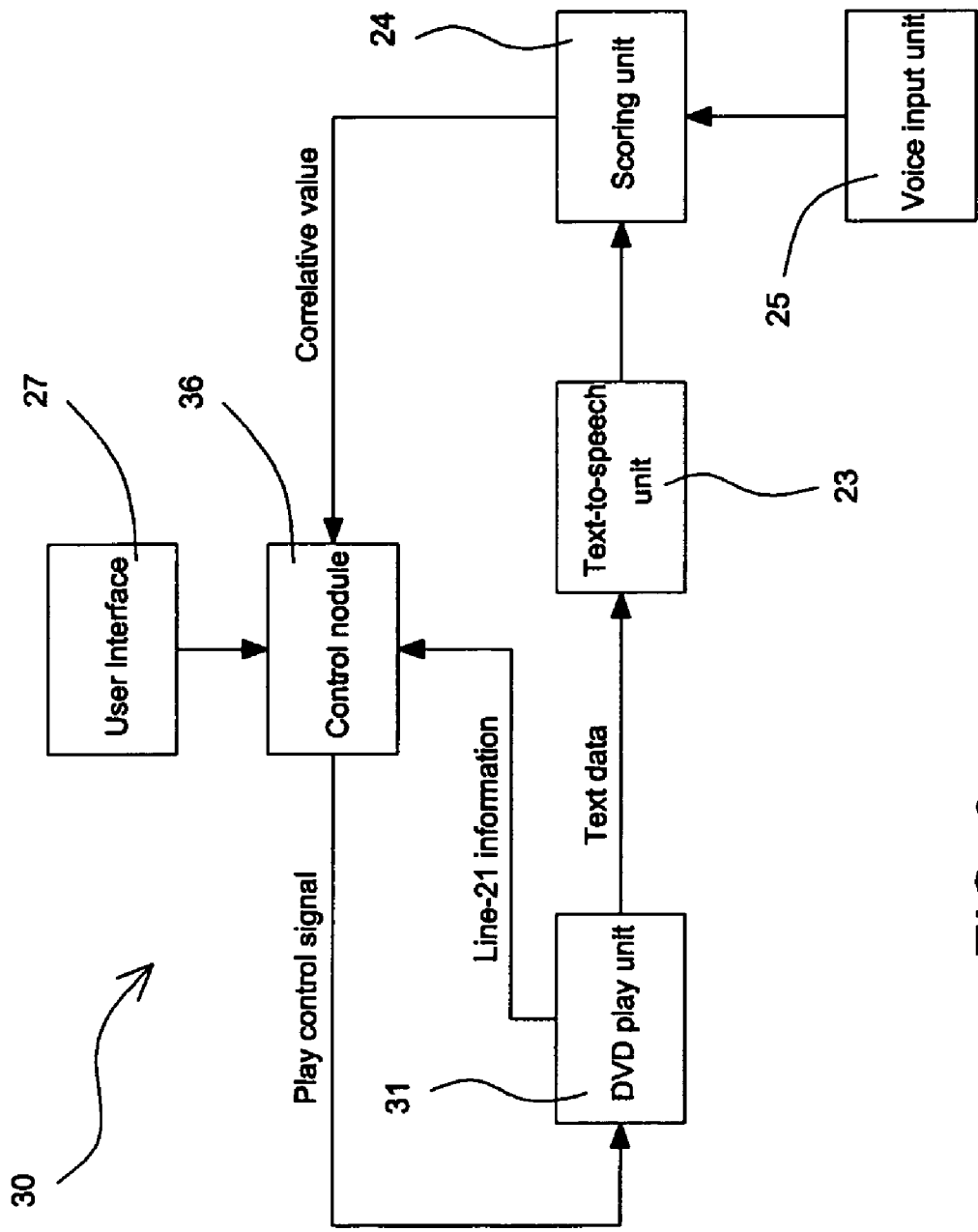
FIG. 3 shows the architecture of a DVD player with language learning function according to a second embodiment of the invention.

FIG. 3 shows the architecture of a DVD player with language learning function according to a second embodiment of the invention. The DVD player 30 of the second embodiment differs from the DVD player 20 of the first embodiment in that the text identifying unit is omitted in the second embodiment. This is because some DVDs may contain Line-21 information. That is, the texts are stored in DVDs in text format. Thus, if the DVDs serve as the audio source media for language learning, the text recognizing step may be omitted. After the Line-21 information is decoded, the text information is directly outputted to the text-to-speech unit. The DVD player 30 with the language learning function includes a DVD play unit 31, a text-to-speech unit 23, a scoring unit 24, a voice input unit 25, a control module 36 and a user interface 27. When the DVD play unit 31 is accessing the DVD with the Line-21 information, it will output the text data and the display time for the text data. The text-to-speech unit 23 receives the text information, finds the audio corresponding to the text from the text-audio database, and outputs the audio signal. The control module 36 also reads the display time for the text information from the DVD play unit 31, and outputs the control information to the DVD play unit 31 according to a user's selection and setting so that the DVD play unit 31 plays the to-be-learned object. The language learning apparatus 30 can utilize a scoring unit 24 to compare the user's pronunciation with the reference audio signal generated by the text-to-speech unit 23, and to generate a correlative value as a reference for the scoring result. The control module 36 can display the scoring result, such as the score, according to the correlative value.

Figure 4:
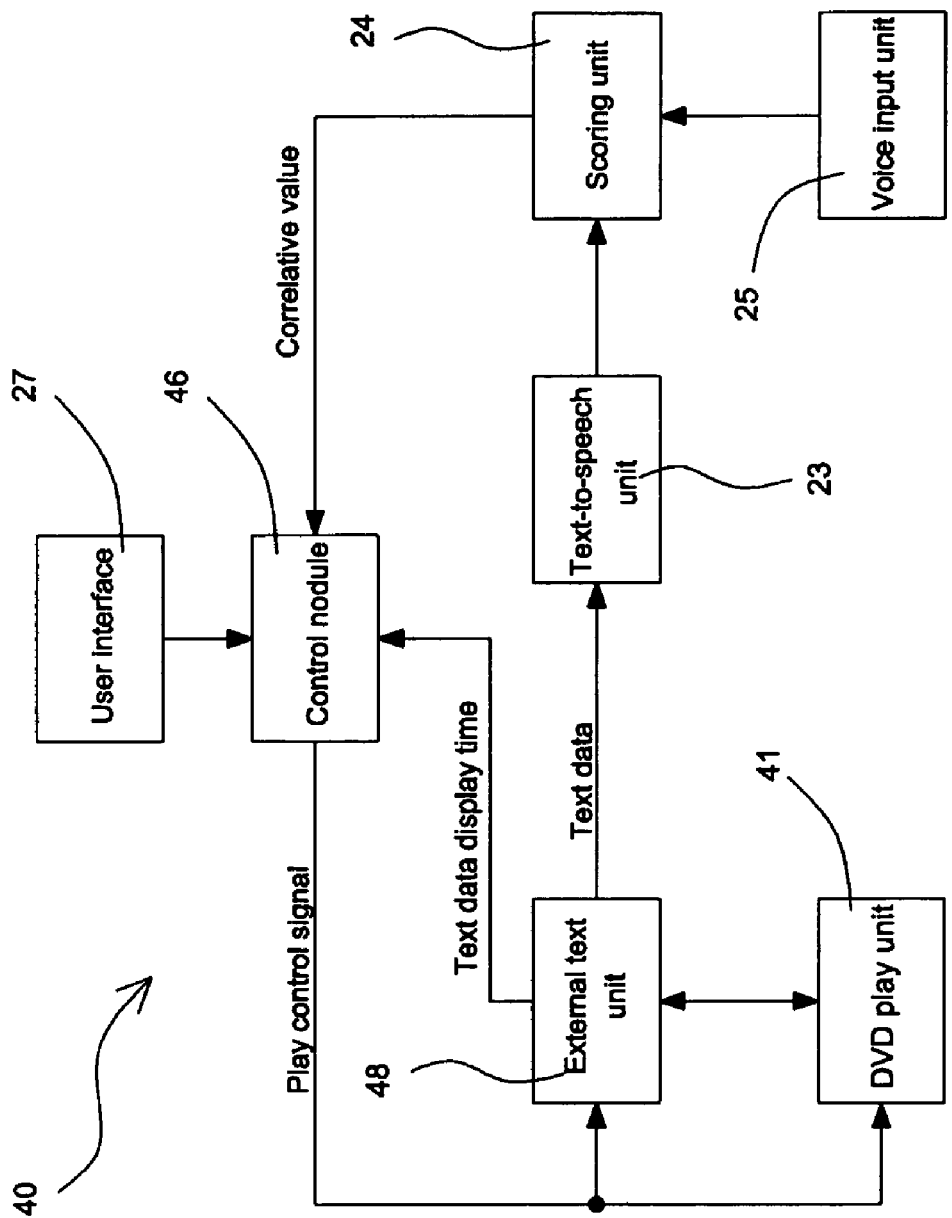
FIG. 4 shows the architecture of a DVD player with language learning function according to a third embodiment of the invention.

FIG. 4 shows the architecture of a DVD player with language learning function according to a third embodiment of the invention. The DVD player 40 of the third embodiment differs from the DVD player 30 of the second embodiment in that an external text unit 48 is added. Therefore, the language learning apparatus 40 includes a DVD play unit 41, a text-to-speech unit 23, a scoring unit 24, a voice input unit 25, a control module 46, a user interface 27 and an external text unit 48. The typical DVD player can be externally connected to a text machine so that the texts of different languages can be displayed. Hence, the language learning apparatus of the invention may also have the external text unit 48 such that the text provided by the external text unit 48 may serve as the to-be-learned object when the language of the built-in text in the DVD player is not the desired to-be-learned language. The information outputted from the typical external text unit 48 contains the text data and the display time for the text data. Thus, the text identifying step may be omitted. The language learning apparatus 40 may utilize a scoring unit 24 to compare the user's pronunciation with the reference audio signal generated by the text-to-speech unit 23, and to generate a correlative value as the reference for the scoring result. The control module 46 can display the scoring result, such as the score, according to the correlative value.

Figure 5:
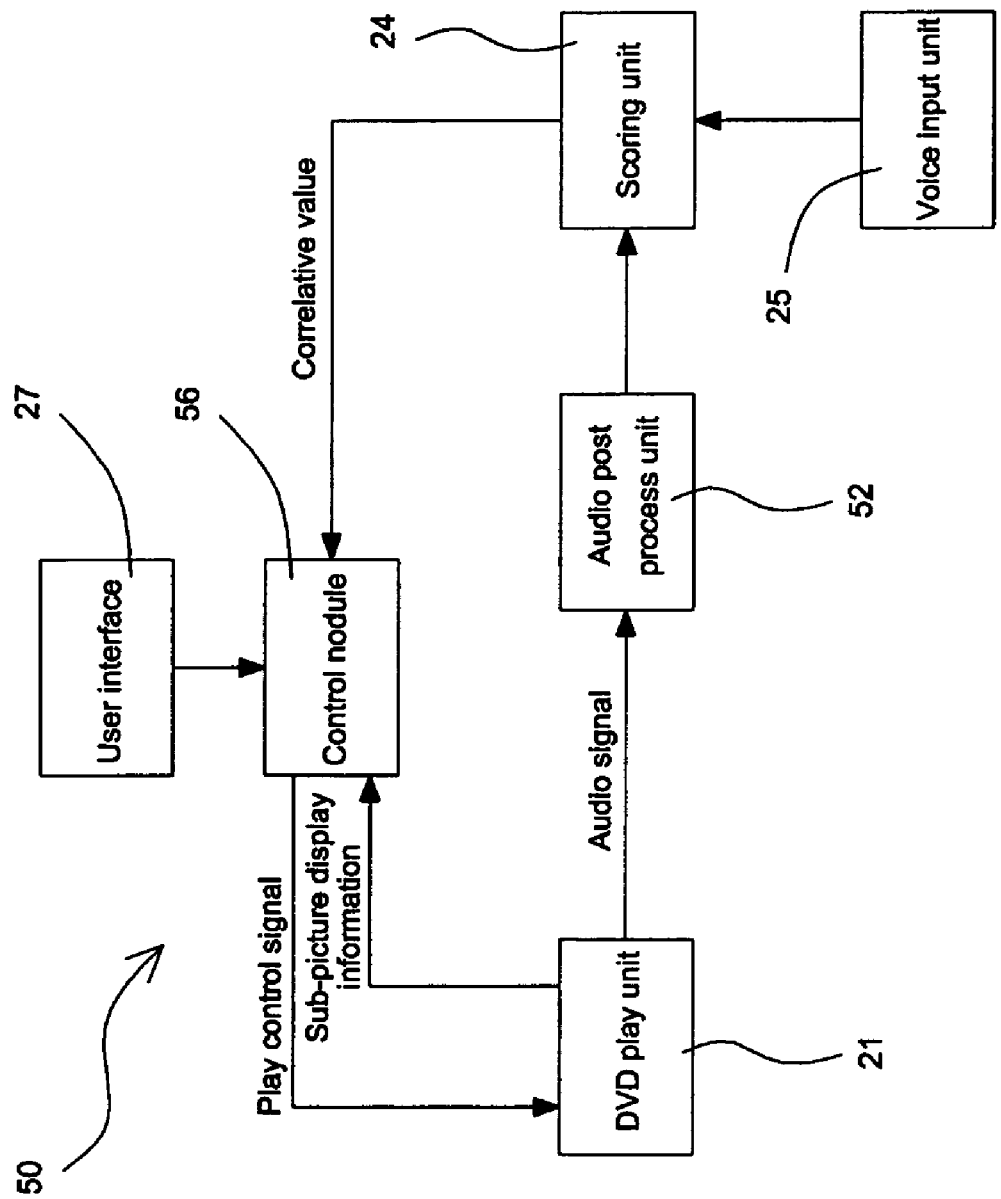
FIG. 5 shows the architecture of a DVD player with language learning function according to a fourth embodiment of the invention.

FIG. 5 shows the architecture of a DVD player with language learning function according to a fourth embodiment of the invention. Referring to FIG. 5, the DVD player 50 with the language learning function of the invention includes a DVD play unit 21, an audio post process unit 52, a scoring unit 24, a voice input unit 25, a control module 56 and a user interface 27.

The DVD play unit 21 has the architecture of a typical DVD player, as shown in FIG. 1. The DVD play unit 21 generates a video signal and an audio signal according to the play control signal. The DVD play unit 21 further outputs the sub-picture display information of the video, which is played currently, to the control module 56. The audio post process unit 52 receives the audio signal outputted from the DVD play unit 21, performs a post process on the audio signal, and then outputs an audio feature signal as the reference audio signal for the scoring unit 24. When the user (learner) is watching the DVD video and wants to learn (listen to) the pronunciation of the displayed subtitle picture, he or she can select the learning mode through the user interface 27. At this time, the control module 56 outputs the play control signal to the DVD play unit 21 and requests the DVD play unit 21 to repeatedly play the currently displayed subtitle picture or play the currently displayed subtitle picture once, and then outputs an audio signal. The user can input his/her voice to the language learning apparatus 50 through the voice input unit 25 (e.g., a microphone) at the same time. The language learning apparatus 50 can utilize a scoring unit 24 to compare the user's pronunciation with the audio feature signal generated by the audio post process unit 52, and to generate a correlative value as the reference for the scoring result. The control module 56 can display the scoring result, such as the score, according to the correlative value.

The audio signal in the typical film can simultaneously contain the background music or other non-human voices. If the audio signal outputted from the DVD play unit 21 is directly processed by way of comparison, the user may not listen to the correct pronunciation, and the scoring unit 24 also cannot perform the scoring precisely. Thus, the invention utilizes the audio post process unit 52 to process the audio signal and then generate an audio feature signal as the reference audio signal of the scoring unit 24. Thus, a more precise result may be obtained because the audio post process unit 52 post-processes the audio signal outputted from the DVD play unit 21, and the scoring unit 24 performs computation and comparison on the post-processed signal. The post-process of the audio post process unit 52 filters out the audio components out of the range of the human voice frequency, such as the background noise or other noises.

The audio post process unit 52 is implemented using a middle band pass filter (not shown). That is, the audio signal outputted from the DVD play unit 21 passes through the middle filter and is then outputted from the filter to the scoring unit 24. The so-called middle band pass filter is to let the signals within the range of the human voice frequency (200 Hz to 4 KHz) pass, and to filter out the high-frequency and low-frequency signals. The scoring unit 24 can adopt the audio waveform correlation as the scoring standard. That is, the waveform correlation between the audio feature signal outputted from the audio post process unit 52 and the external voice signal outputted from the voice input unit 25 is computed. The higher the correlation is, the higher the score is.

Figure 6:
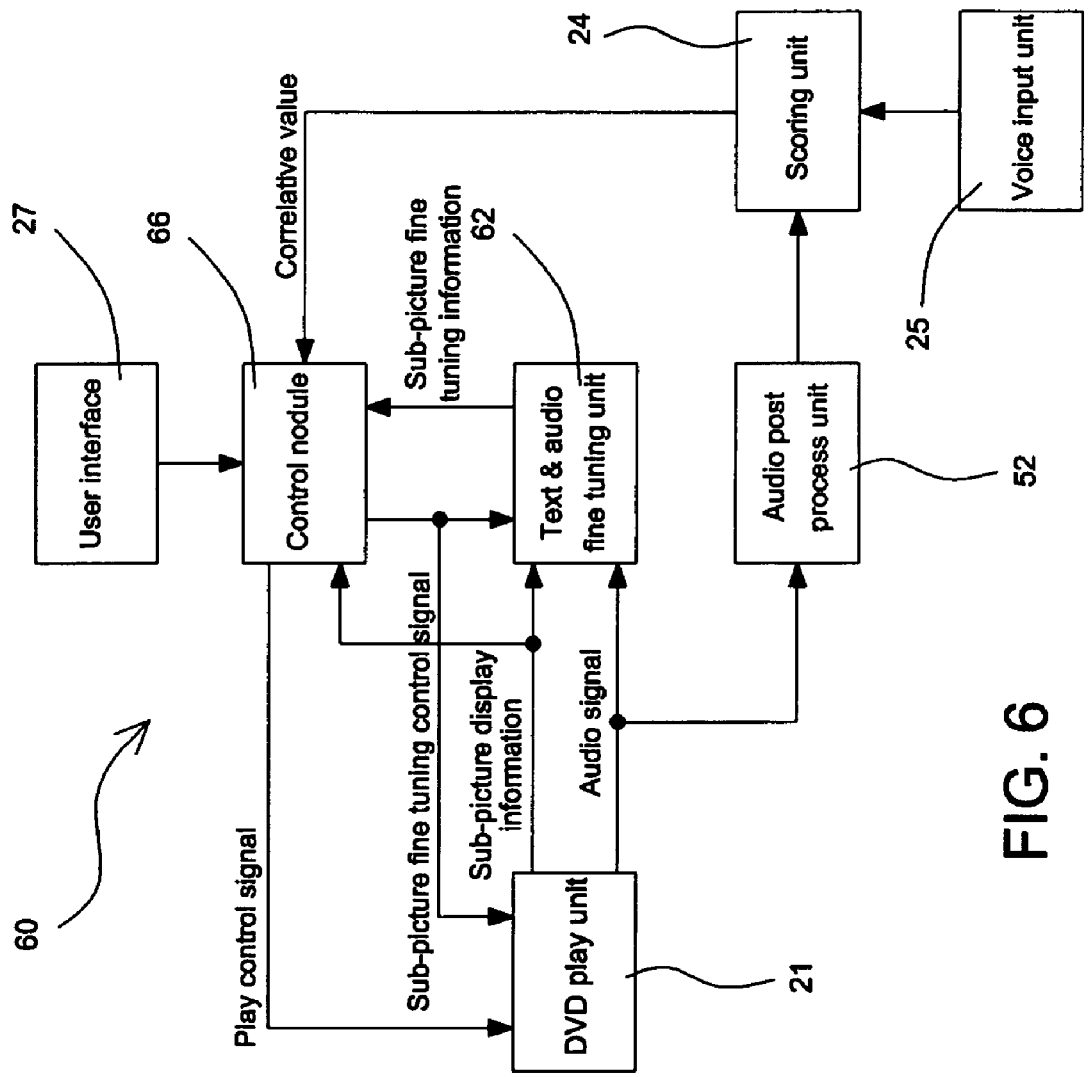
FIG. 6 shows the architecture of a DVD player with language learning function according to a fifth embodiment of the invention.

FIG. 6 shows the architecture of a DVD player with language learning function according to a fifth embodiment of the invention. Referring to FIG. 6, the DVD player 60 of the invention with the language learning function includes a DVD play unit 21, a text audio fine tuning unit 62, an audio post process unit 52, a scoring unit 24, a voice input unit 25, a control module 66 and a user interface 27. The functions of the audio post process unit 52, the scoring unit 24, and the voice input unit 25 are the same as those of the above-mentioned embodiment, and detailed descriptions thereof will be omitted.

The DVD play unit 21 is substantially the same as the DVD player, as shown in FIG. 1, except for the difference that the DVD play unit 21 can receive the sub-picture fine tuning control signal outputted from the control module 66 and enters a special mode (subtitle picture audio front processing mode). In the general mode, the DVD play unit 21 plays the video and audio according to the play control signal, which includes the start time and end time for playing the paragraph and is outputted from the control module 66. When the user (learner) is watching the DVD video and needs to learn (repeatedly listen to) the pronunciation of the displayed subtitle picture, he or she can use the user interface to select the learning mode and to repeatedly play some text paragraph or play some paragraph once so as to learn by way of repeated listening.

In this mode, before a piece of text pronunciation is repeatedly played, the control module 66 enables the sub-picture fine tuning control signal such that the DVD play unit 21 and the text audio fine tuning unit 62 enter the subtitle picture audio fine tuning mode simultaneously. Therefore, when the sub-picture fine tuning control signal is enabled, the DVD play unit 21 generates the audio signal and the sub-picture display information corresponding to the text paragraph according to the data on the disk, and transfers the audio signal and the sub-picture display information to the text audio fine tuning unit 62, but does not output the audio and video for the user to listen to and watch. After the text audio fine tuning unit 62 receives the audio signal and the sub-picture display information outputted from the DVD play unit 21, a fine tuning process is performed to generate the sub-picture fine tuning information, which is transferred to the control module 66. The control module 66 receives the sub-picture fine tuning information outputted from the text audio fine tuning unit 62, and then outputs a new play control signal and disables the sub-picture fine tuning control signal. At this time, the DVD play unit 21 enters a general mode and outputs the audio and video according to the new play control signal.

The text audio fine tuning unit 62 outputs sub-picture fine tuning information in order to make the repeatedly played pronunciation of the text paragraph more suitable for the user to listen to and/or for the scoring unit to score. The post-process performed by the text audio fine tuning unit 62 is to judge the end point of sentence-breaking of the human voice according to the volume curve and the zero crossing rate curve of the audio. Thus, the start time and end time for the repeated play can be finely tuned.

Figure 7:
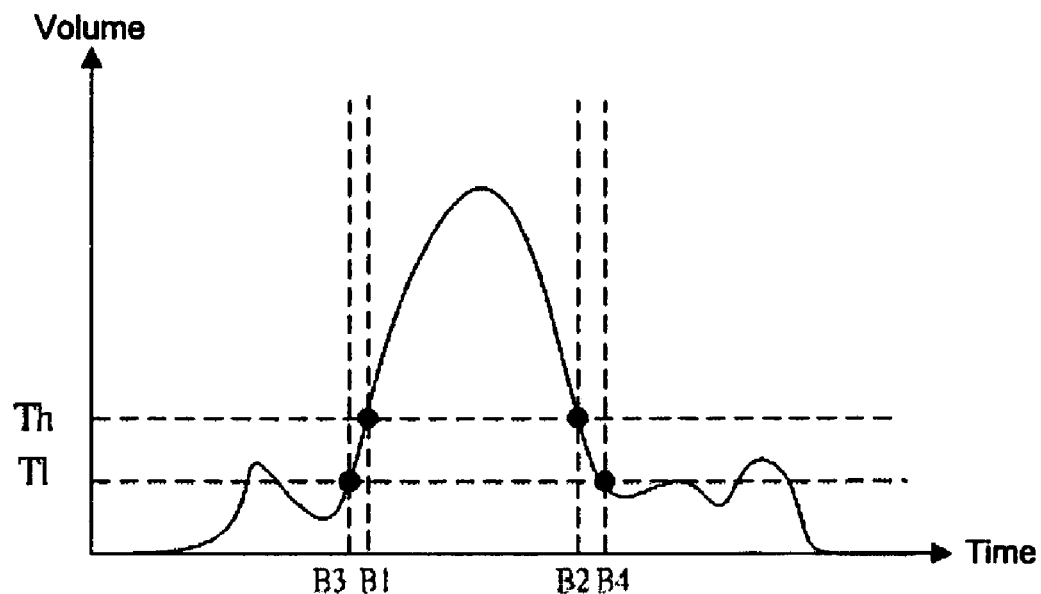
FIG. 7 shows a curve of a relationship between the volume/energy of an audio signal and the time axis.
Figure 8:
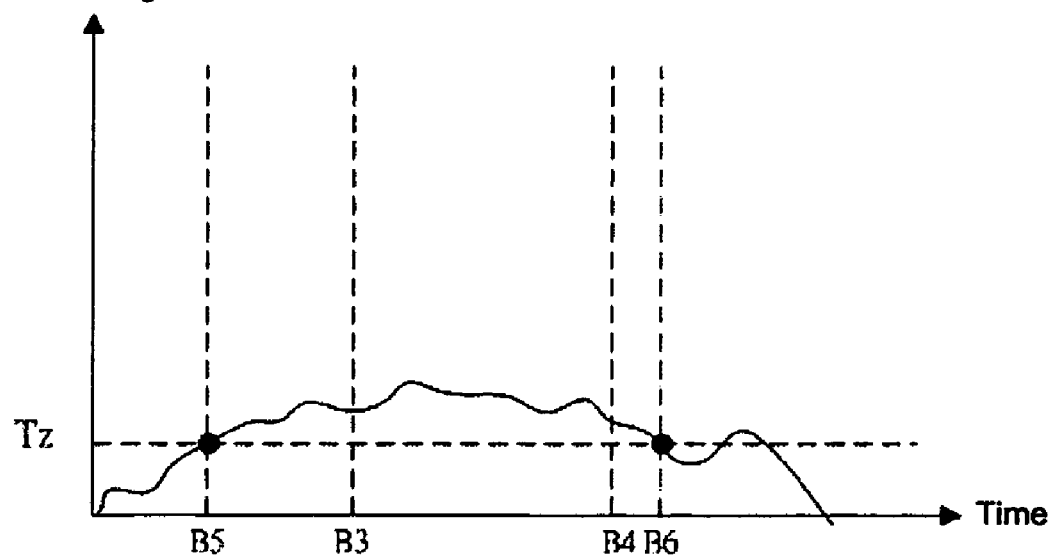
FIG. 8 shows a curve of a relationship between the zero crossing rate of an audio signal and the time axis.

The processing method of the text audio fine tuning unit 62 includes the steps of:

(a) receiving a piece of audio signal and computing the volume distribution curve thereof to obtain a relationship between the volume (energy) and the time axis, as shown in the curve of FIG. 7;

(b) setting an end point of a period as a sentence-breaking end point, as shown in B1 to B2 of FIG. 7 if the period of volume is higher than a high volume threshold value Th;
(c) extending the sentence-breaking end point to the time instant at which the volume equals a low volume threshold value T1, as shown in B3 to B4 of FIG. 7;
(d) calculating a zero crossing rate curve to obtain a relationship between the zero crossing rate and the time axis, as shown in FIG. 8, wherein the zero crossing rate represents the number of times that the audio passes through the zero in each frame;
(e) extending the sentence-breaking end point to the time instant at which the zero crossing rate equals Tz according to a zero crossing rate threshold value Tz, as shown in B5 to B6 of FIG. 8; and
(f) setting the repeated play time as the audio sentence-breaking time if the text display time is longer than the audio sentence-breaking time, as shown in B5 to B6 of FIG. 8.

Because the object of the invention is to make the DVDs be the audio source media, the embodiment utilizes the text audio fine tuning unit 62 to find the best sentence-breaking time when the user selects to repeatedly listen to the audio of some frame. Therefore, the control module 66 receives the sub-picture fine tuning information outputted from the text audio fine tuning unit 62, and then outputs a new play control signal, enables the DVD play unit 21 to enter a general mode, and outputs the audio and video according to the new play control signal.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. A DVD player with language learning function, the player comprising:
   a control module for receiving sub-picture display information and generating a play control signal, wherein the control module enables a sub-picture fine tuning control signal in a learning mode;
   a DVD play unit for receiving the play control signal, playing a video and an audio of a DVD, and outputting an audio signal and the sub-picture display information; and
   a text audio fine tuning unit for receiving the audio signal, the sub-picture display information and the sub-picture fine tuning control signal, and generating sub-picture fine tuning information according to distribution of the audio signal when the sub-picture fine tuning control signal is enabled,
   wherein after the control module enables the sub-picture fine tuning control signal, the control module further receives the sub-picture fine tuning information and outputs the play control signal again and disabling the sub-picture fine tuning control signal according to the sub-picture fine tuning information.

2. The DVD player according to claim 1, further comprising a user interface, through which a user can set a learning mode.

3. The DVD player according to claim 2, wherein the learning mode comprises a word repeat play, a single sentence repeat play, and a paragraph repeat play.

4. The DVD player according to claim 1, wherein the DVD play unit further receives the sub-picture fine tuning control signal and is disabled from outputting the audio and video for a user when the sub-picture fine tuning control signal is enabled.

5. The DVD player according to claim 1, further comprising:
   an audio post process unit for receiving the audio signal, acquiring features of the audio signal, and then outputting an audio feature signal;
   a voice input unit for receiving voice and then generating an external voice signal; and
   a scoring unit for receiving the audio feature signal and the external voice signal, computing a correlation between the audio feature signal and the external voice signal, and then generating a correlative value.

6. The DVD player according to claim 5, wherein the control module further receives the correlative value of the scoring unit and displays a scoring result according to the correlative value.

* * * * *